July 20, 1954     D. L. NEVINS     2,683,906
PORE CLOSURE FOR DOUBLE GLAZED UNITS AND METHOD OF PRODUCING SAME
Filed May 15, 1952     2 Sheets-Sheet 1

INVENTOR.
DONALD L. NEVINS
BY Oscar L. Spencer
ATTORNEY

July 20, 1954 D. L. NEVINS 2,683,906
PORE CLOSURE FOR DOUBLE GLAZED UNITS AND METHOD OF PRODUCING SAME
Filed May 15, 1952 2 Sheets-Sheet 2
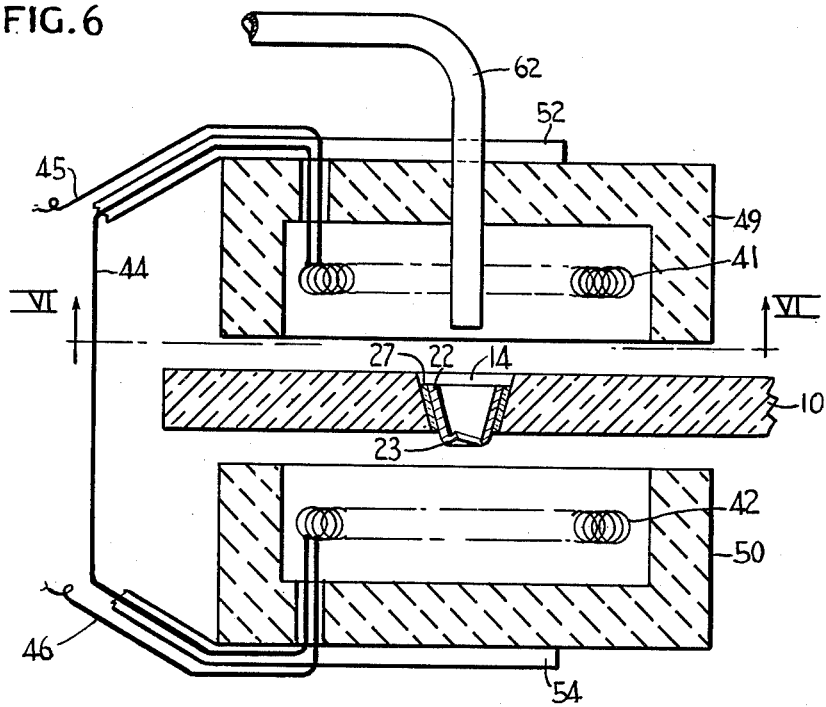
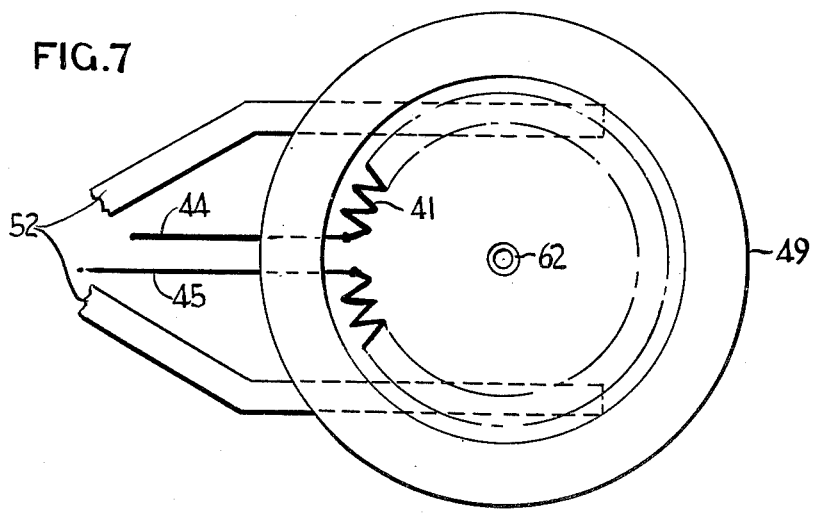
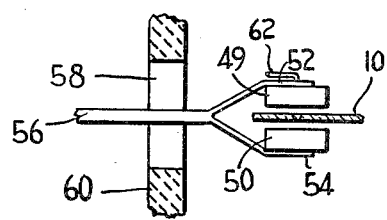
INVENTOR.
DONALD L. NEVINS
BY
Oscar L. Spencer
ATTORNEY Patented July 20, 1954

2,683,906

UNITED STATES PATENT OFFICE 2,683,906

PORE CLOSURE FOR DOUBLE GLAZED UNITS AND METHOD OF PRODUCING SAME

Donald L. Nevins, Port Allegany, Pa., assignor to Pittsburgh Corning Corporation, Allegheny County, Pa., a corporation of Pennsylvania Application May 15, 1952, Serial No. 287,823

14 Claims. (Cl. 20—56.5)

The present invention relates to double glazed units comprising spaced sheets of glass hermetically sealed together about their edges and it has particular relation to the sealing of pores or vents employed for the equalization of pressures between the inside and outside of the unit during manufacture and for inserting an amount of dry gas in the interior of the unit.

It is known that windows comprising spaced sheets of glass, the edge portions of which are appropriately sealed together to contain a dead air space, provide a good insulating glazing. One method for forming a hermetically sealed double glazed unit is set forth in U. S. Patent No. 2,389,360. This method comprises applying stripes of a conductive material, such as aquadag, near the edges of two sheets of glass, supporting the sheets in horizontal position one above the other, passing an electrical current through the stripes to generate heat sufficient to soften the contiguous glass and allowing the edge portions of the upper sheet to drop down. The dropped edge portions are then brought into contact with the lower sheet and the contacting portions of the glass are fused together to provide a continuous welded glass seal. The welded units are then cooled in a lehr to anneal the glass.

In a later and improved technique as disclosed in an application by William R. Clever and Harry O. Phalin, filed March 14, 1950, Serial No. 149,562, now matured into U. S. Patent No. 2,624,979, granted January 13, 1953, entitled "Method of Producing Welded Double Glazed Units," two sheets of glass are juxtaposed with only about a sixteenth of an inch space between them. Preferably, the upper sheet is about a quarter or an eighth of an inch wider than the lower, in both horizontal dimensions. The upper sheet is also provided with marginal conductive stripes and one of the sheets, preferably the upper one, is provided with a pore hole usually near a corner. The sheet with the electrically conducting stripes on it is heated electrically at the margins so that the margins drop and become thoroughly welded to the lower sheet. The upper sheet is then pulled upwardly, by a vacuum device, to provide the necessary spacing of the sheets and may be vibrated up and down slightly to cause the glass at the union to become more thoroughly filleted. A further method of filleting the union at this stage of the weld is to direct a blast of air at the pore hole in order to increase momentarily the pressure within the unit. Subsequently, the units are annealed and the vents are sealed by the technique herein described.

It has also been proposed to form glass sealed, double glazed units by spacing sheets of glass by means of strips of glass, the edges of which have been coated with a paste or a powder of a glass having a low fusion point, and then heating the assembly to fuse the paste and provide a seal between the joints of the assembly.

In forming units by these and similar methods, it will be obvious that the gases between the sheets of glass become highly heated and expand. As these heated gases cool down during the annealing operation, the gases contract thus tending to set up a vacuum within the unit. In order to prevent the collapsing or shattering of the unit by the resultant differential pressure, the units are customarily formed with small openings at some convenient point through which gases can enter the units.

Unless these small pore holes or vents are adequately sealed after the units are cooled, water vapors could enter the units at will and thus destroy their utility. The adequate sealing of these pore holes or vents has constituted one of the main problems in the construction of units formed by welding the edges of the glass sheets together. Practically all organic adhesive materials are characterized by permeability to moisture and may even contain moisture themselves. Therefore, where the pore holes are sealed with organic plastics alone, water vapors soon enter the unit.

The present invention is based upon the provision of a structure suitable as a closure for the pore hole for welded or otherwise formed double glazed units which comprises a thin, threadless, metallic, tubular sleeve or eyelet secured in the pore hole by means of a low fusion point glass having a coefficient of expansion approximating that of the glass of the sheets from which the double glazed units are formed, the sleeve in turn being closed by means of a suitable metallic screw member inserted and sealed into the sleeve. The metal sleeve is curved inwardly at the bottoms so as to receive the screw member.

For a better understanding of the invention, reference may now be had to the accompanying drawing in which like numerals refer to like parts throughout and in which:

Fig. 5 is a diagrammatic view illustrating a method of and suitable apparatus for sealing the metal eyelet in the pore hole;

Fig. 6 is an enlarged fragmentary view, partially in section and partially in elevation, of the apparatus shown in Fig. 5, and Fig. 7 is a view taken along lines VII—VII in Fig. 6.

Figure 1:
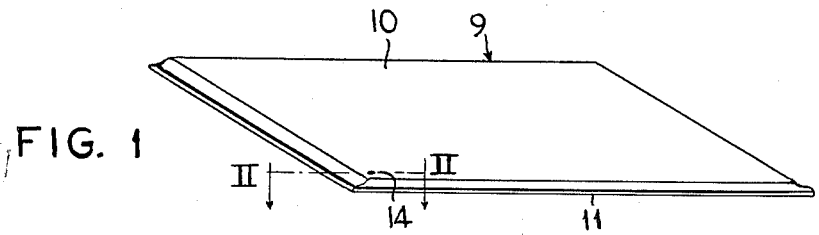
Fig. 1 is a diagrammatic view of a double glazed unit embodying the invention.
Figure 2:
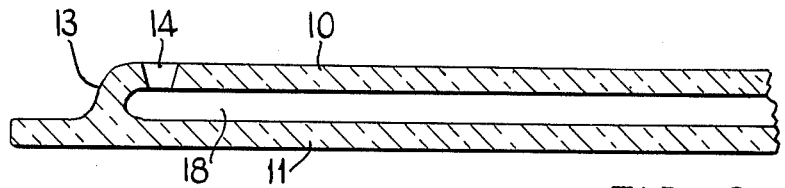
Fig. 2 is a view, partially in section and partially in elevation taken along lines II—II of Fig. 1 illustrating one type of pore or vent hole in a double glazed unit.

A double glazed unit 9 embodying the principles of the invention comprises spaced sheets of glass 10 and 11 as shown in Figs. 1 and 2. The former sheet 10 may have marginal portions 13 bent down and welded to the upper face of sheet 11 by the process and apparatus shown in U. S. Patent No. 2,389,360. The welding may be substantially at the edge of the sheet 11 as shown in the drawing, or it may be spaced a distance from the edge of sheet 11 in order to provide a flange which is one thickness of glass and may be puttied or otherwise secured in the opening which it is desired to close.

The pore hole or vent is indicated generally by the numeral 14 and may be disposed at any convenient point in the unit, but as shown in the drawings, it is usually disposed near the edge of upper sheet 10 and preferably near a corner of said sheet. A single opening may be formed, but other openings may be provided as necessary or desired. Dry gases, such as dehumidified air, can be blown into the opening in order to quickly sweep out moist gases within the chamber 16.

The pore closure structure and several of the stages embodied in the installation thereof as applied to the units prepared in accordance with U. S. Patent No. 2,389,360 or the Clever et a. application, are shown on a greatly enlarged scale in Figs. 3 and 4 of the drawing. The structure as shown includes an opening 14 formed near the edge portion of sheet 10. This opening may be outwardly flared, for example, at an angle of approximately 60 to 75 degrees at its outer face. Other angles of taper may be employed as well as combinations of various tapers if desired. For example, the opening 14 may be tapered at the inner and outer faces of the glass sheet and the intermediate portion may be cylindrically bored or slightly tapered.

The closure structure for the unit includes a metal sleeve or eyelet element 22. A nickel-iron alloy containing 48 per cent by weight of nickel and 52 per cent by weight of iron and having a coefficient of expansion closely matching that of the glass 10 has been found to be a suitable metal for the sleeve or eyelet element 22. The eyelets 22 include a sleeve portion tapered to conform to the pore opening and have one side 23 of the bottom portion of the sleeve bent inwardly and slightly upwardly in a manner adapted to receive a screw member 25.

Figure 3:
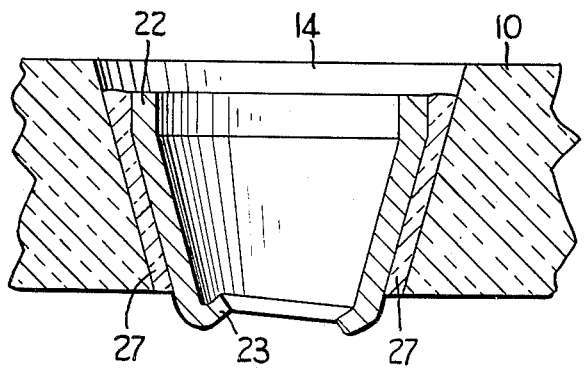
Fig. 3 is an enlarged sectional view of a fragment of a double glazed unit illustrating the vent or pore opening having a threadless, metal eyelet inserted therein.
Figure 4:
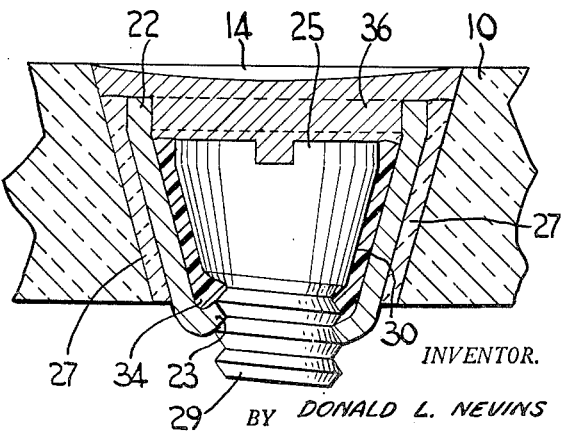
Fig. 4 is an enlarged fragmentary, sectional view of a double glazed unit showing the vent or pore opening and illustrating a pore closure embodying the principles of the invention.

The eyelet and screw should have a coefficient of expansion closely matching the coefficient of expansion of the glass 10. One advantage to the particular design of sleeve shown in Figs. 3 and 4 is that the sleeve may be very thin and this tends to minimize the stresses which would be set up due to any difference in the coefficient of expansion between the sleeve and the glass. When an internally threaded metal eyelet is employed, the thickness of the walls of the eyelet or sleeve must be much greater in order to provide threads on the inside of the sleeve, therefore, the matter of matching the coefficients of expansion of the metal sleeve and the glass is of prime importance. Another advantage in the use of a thin, threadless metal eyelet is that it is considerably less expensive than an internally threaded eyelet.

It is to be observed that the sleeve is exteriorly coated with and bonded to a layer of glass 27 which is also bonded or welded to the continuous glass 10 of the opening 14. The layer of glass 27 has a lower softening or fusion point than the contiguous glass, but it should have a coefficient of thermal expansion approximately fairly closely that of the glass 10 to which it is united. The composition of the low fusion glass to be used will vary depending upon the point of melting desired therein and also upon the coefficient of thermal expansion of the glass to which it is to be bonded. Usually, the thermally welded units will be formed of conventional lime-soda silica window glass which is the least expensive of all glasses available for this purpose. Any other glass or combinations thereof could also be employed.

The bonding glass for securing the eyelets 22 in the openings in the sheets of such glass is preferably fused as a coating on the eyelet before the latter is inserted in the pore opening; however, it may be fused on the walls of the pore opening or both. The bonding glass may conventionally embody high percentages of lead oxide, boric oxide, and alumina. By appropriately adjusting these components in the glass, practically any coefficient of thermal expansion can be closely matched and at the same time the fusion point of the bonding glass can be maintained sufficiently low to assure that it will bond to the glass contiguous the pore opening during the welding operation.

A convenient mode of coating the exterior of the eyelets with low melting glass involves the step of first heat treating the eyelet in air to provide a durable oxide coating on the outer surface of the eyelet. This treatment provides a better physical surface on the eyelet to which the low melting glass can adhere. A temperature of 1600° F. maintained for about 20 minutes is usually sufficient to accomplish this treatment. The eyelet is then heated to the temperature of the fusion point of the low melting glass and the glass is applied to the eyelet. This application may be by spraying or by otherwise coating the metal eyelet with the low melting glass.

One method of application which has been found acceptable is to mix 100 grams of a low fusion point glass which has been milled to a particle size which will permit approximately 90 per cent or more to pass through a 325 mesh screen, with a carrier, for example 50 milliliters of methanol, and a few cubic centimeters of Epsom salt solution. This mixture is put in a small ball mill and milled. Small amounts of the milled mixture are then placed in an air brush and sprayed on the eyelet while the eyelet is rotated on a pin. The mixture dries almost immediatly and the coated eyelet is then fired at a temperature of approximately 1400° F. to produce a glaze on the eyelet.

The sleeve 22 in the pore assembly is closed by means of a screw member 25 which preferably comprises a threaded portion 29 and a large head 30 whose outer contour conforms substantially to the internal contour of the metal eyelet 22 and has a slot for a screw driver. If the eyelet and screw member are accurately fitted, the contact between the metal surface may be relied upon to keep out air and moisture; however, the screw usually is coated with a layer 34 of plastic material designed to provide a permanent seal between the metal eyelet and the screw.

Appropriate plastics for the purpose of sealing the threads include synthetic rubber such as Thiokol, methyl methacrylate polymers, rubber polymers and isomers, polystyrene, polyvinyl chloride, hot melt waxes, vinyl acetal resins such as are employed in safety glass, and many others. A convenient composition includes a liquid mixture of a Glyptal or alkyd resin and a "silicone" or silicon ester resin. The Glyptal resin is a polyester of glycerol and phthalic acid. It may include a drying oil acid or other fatty acid, e. g. linolenic acid, in a proportion, for example, of equal mols per mol of phthalic acid. These two components may be combined over a relatively broad range, e. g. 10 to 90 percent of the former to a corresponding range of the latter. The preparation of these types of resins is a conventional procedure, and both types can be purchased commercially.

An additional plastic or resin which has been found to be highly effective for sealing the screw member in the eyelet is a composition which is the reaction product of bisphenol A and epichlorohydrin. These compositions are known as "epon" resins.

If desired, the outer face of the closure assembly and the contiguous glass may be given a coating 36 of a low fusion metal. Suitable low fusion metals include lead, and low melting alloys such as solder, Rose metal, and others.

In the formation and sealing of the unit in accordance with the provisions of the present invention, the techniques of heating the glass and uniting the heated portions to form the units follow conventional procedures such as are exemplified by the above-mentioned patent and pending application. A glass sheet that has been appropriately bored to form a pore hole as indicated in Fig. 1 of the drawing is employed as one sheet 10 of the unit. The holes may have the cross sectional configuration shown in the drawing or any other suitable configuration. The sheets 10 and 11 should be thoroughly cleaned and stripes of a conductive material such as "aquadag" applied to the marginal edges of at least one of the sheets. These stripes may be applied by rollers, by brushing or by any other appropriate technique.

The sleeves or eyelets 22 having a coating 27 of low fusion glass adherent thereabout are inserted in the pore openings at this stage of the operation. The sleeve and the coating thereupon are slightly less in exterior diameter at its maximum than the internal diameter of the pore opening 14 at its maximum.

After the sleeves or eyelets have been inserted in the pore opening, the sheets 10 and 11 are preheated and superposed in spaced relation. Then current is applied to the conductive stripes to soften, form and fuse together the edges of the sheets. The heating is in accordance with the technique described in the foregoing patent and pending application. If the pore hole or vent is near the edge of the glass, the coated eyelet becomes highly heated and the glass coating upon the eyelet fuses to the contiguous surface of the pore hole and the eyelet settles into position.

During this operation the temperature of the coated eyelet should be maintained preferably at a temperature between 900 and 1300° F. The maintaining of the coated eyelet at this temperature can be accomplished by directing air heated within this temperature range against the eyelet. The blast of air used to fillet the union of the double glazed unit as described above in connection with the Clever et al. application may be heated and employed to maintain the correct temperature of the eyelet.

The direction of a heated gas such as air against the eyelet during the welding operation enables uniform heating and sealing of the eyelet. If the heat from the weld alone is relied on to heat the coated eyelet, the side of the eyelet adjacent the electrically conducting stripe and line of weld is heated to a higher temperature than the side of the eyelet away from the line of weld. This uneven heating of the eyelet causes uneven sealing of the coated eyelet to the glass 10 and sets up stresses in the seal. Failures of an eyelet unevenly sealed have usually occured in the portion of the seal away from the weld.

The use of heated air to maintain the eyelet at a temperature usually between 900 and 1300° F. during the welding operation prohibits over heating of the eyelet during the welding cycle and also prohibits chilling of the eyelet during the filleting operating when a blast of air is employed to fillet the union as described above.

If the glass coating 27 on the eyelet is overheated, the glass 27 will boil and combine with the glass 10 to form a glass having entirely different physical characteristics than either of the original glasses. This sets up strains and bubbles in the seal which tend to cause fracture at the seal zone. If the glass 27 is chilled during or immediately after the welding operation, the side of the eyelet away from the weld will not seal to the glass 10.

The sealing of the coated eyelet 22 in the pore hole 14 can also be effected during the preheating of the glass 10 prior to the welding operation. This can be done as shown in Figs. 5, 6 and 7 by the use of a localized auxiliary heat source in the preheating furnace. This localized auxiliary heat source is designed to heat primarily the glass immediately adjacent and surrounding the pore hole 14.

The localized auxiliary heat may be provided by a coil electric heater, induction heating, heated air or other means allowing close control of the temperatures of both the eyelet 22 and the glass 10 immediately adjacent the eyelet.

As shown in Figs. 5, 6 and 7, the localized auxiliary heat source is a coil electric heater which includes Nichrome wire coils 41 and 42 connected in series by lead 44 to a source of power (not shown) by leads 45 and 46. The coils 41 and 42 are mounted centrally in spaced relation above and below the pore hole 14 in cuplike, refractory receivers 49 and 50 which are in turn rigidly supported on arms 52 and 54 of a support 56. The support 56 also carries leads 44, 45 and 46 and extends through an opening 58 in the preheating furnace wall 60. The support 56 may be manually or mechanically positioned with respect to the glass sheet 10 and pore hole 14.

The inside diameter of the circular coils 41 and 42 is preferably slightly larger than the diameter of the pore hole. This ensures adequate heating of the glass 10 surrounding the pore hole.

A combination of the heating coils 41 and 42 and a blast of heated air as described above with respect to the maintaining of the temperature of the eyelet 22 during the welding cycle has been found to provide the best presently known method of sealing the coated eyelet in the pore hole. The air may be directed on the eyelet through a tube 62 passing centrally through receiver 49 and the coil 41 and extending slightly below the coil 41. The tube 62 may be of stainless steel or other suitable material and may be connected to a source of heated high pressure air by means of a suitable flexible connection.

This heating operation is conducted by heating the coated eyelet and the glass 10 immediately adjacent the pore hole to cause the glass 27 to be sufficiently molten, for example about 1100° F., by means of the electric coil heater shown or by other suitable means and then directing a blast of heated high pressure air (approximately 90 pounds per square inch) on the eyelet for about two to five seconds to force it down into the hole. The temperature of the air is preferably about 800 to 1300° F. when it contacts the eyelet. Cold air cannot be used in this operation, since it would chill the glass 27 to its set point before any movement of the eyelet could be effected.

In accordance with a further embodiment of the invention, the metal sleeve may be sealed in a pore hole which is located in the line of the electrically conducting stripe. The metal sleeve or eyelet is inserted in the pore hole prior to the welding operation and the edges of the glass sheets are welded together as described above. When the edge of the upper sheet is brought to the melting point and droops down to engage the lower sheet during the welding operation, the metal eyelet is brought down with it and the eyelet is sealed in the edge of the unit. In such case the metal eyelet may be oxidized as described above but need not be coated with the low melting point glass.

The gases contained in the units may be conveniently expelled by forcing a dried gas, such as dry air, into the pore opening. When the units are sufficiently purged, the pore openings are closed by insertion of a screw member 25 which has been properly coated with a plastic as described above. This plastic coating may be applied by dipping the screws in, or spraying them with a solution of the desired plastic, shaking the screw free of any excess and then allowing the solvent in the plastic to evaporate. Dipping the screws in molten plastic, or dusting the screws while heated with fusible plastic or resin are contemplated. After the screw has been inserted, the unit may be heated or baked.

When the screw member 25 has been inserted, the entire pore closure assembly may be covered with the fusible metal or alloy indicated at 36. Various modes of application may be employed. A convenient method or mode includes priming the surfaces by projecting powdered metal against the face to be coated and then applying a coating of molten solder with a torch or hot iron. Various resin or plastic materials such as synthetic rubber materials may be used to seal the pore closure assembly in place of the fusible metal or alloy.

It is to be understood that the coating of the assembly with solder or other fusible metal or plastic material is optional and by way of precaution to prevent possible tampering with the screw. In some cases it may not be required as the screw provides an adequate seal without further treatment.

The application of the principles of the invention to the sealing of pore holes in double glazed units is not limited to the process or product illustrated in U. S. Patent No. 2,389,360 or to the product or process illustrated in the pending application of Clever et al. It will be understood by those skilled in the art that the embodiments of the invention herein described are given by way of example. Various modifications may be made therein without departure from the spirit of the invention or the scope of the appended claims.

I claim:

1. In a double glazed unit having a pore opening formed in a wall thereof, a closure structure for the opening comprising a thin, threadless, metallic sleeve secured in said opening by a vitreous bond of glass of low fusion point adherent to the exterior of the sleeve and to the walls of the pore opening in said unit to provide a seal impermeable to moisture, the lower portion of said sleeve being bent inwardly in a manner adapted to receive a screw member, and a screw member inserted therein to seal the opening.

2. In a double glazed unit having a tapered opening formed in a wall thereof, a closure structure for the opening comprising a thin, threadless, metallic sleeve tapered to conform to the pore opening and secured in said opening by a vitreous bond of glass of low fusion point adherent to the exterior of the sleeve and to the glass of said unit to provide a seal impermeable to moisture, the lower portion of said sleeve being bent inwardly and upwardly in such manner as to receive a screw member, and a screw member inserted therein to seal the opening.

3. A closure structure as defined in claim 2 in which the screw member is coated with a plastic material.

4. A closure structure as defined in claim 2 in which the screw member is coated with a plastic composition comprising a Glyptal resin and a silicon ester resin.

5. A pore closure structure as defined in claim 2 in which the screw member is coated with a plastic composition comprising a reaction product of bisphenol A and epichlorohydrin.

6. A pore closure structure as defined in claim 2 in which the exterior portions of the sleeve and screw after being fitted into the sleeve are coated with a metal of low fusion point.

7. A method of sealing a pore opening of a double glazed unit which comprises coating the external periphery of a thin metal sleeve with a glass having a low fusion temperature, inserting the coated sleeve into the pore opening, heating the glass immediately surrounding the pore opening to a temperature sufficient to cause the low fusion glass to be molten, directing a blast of a heated high pressure gas on the sleeve and subsequently closing the internal opening of the sleeve.

8. A method of sealing a pore opening of a double glazed unit which comprises coating the external periphery of a thin metal sleeve with a glass having a low fusion temperature, inserting the coated sleeve into the pore opening, heating the glass immediately surrounding the pore opening to a temperature sufficient to cause the low fusion glass to be molten, directing a blast of a heated high pressure gas on the sleeve and subsequently closing the internal opening of the sleeve by inserting a screw member therein.

9. A method of sealing a pore opening of a double glazed unit which comprises coating the external periphery of a thin metal sleeve with a glass having a low fusion temperature, inserting the coated sleeve into the pore opening, heating the glass immediately surrounding the pore opening to a temperature sufficient to cause the low fusion glass to be molten, directing a blast of a heated high pressure gas on the sleeve and subsequently closing the internal opening of the sleeve by inserting a screw member therein which is coated with a plastic material.

10. A method of sealing a pore opening of a double glazed unit which comprises coating the external periphery of a thin metal sleeve with a glass having a low fusion temperature, inserting the coated sleeve into the pore opening, heating the glass immediately surrounding the pore opening to a temperature sufficient to cause the low fusion glass to be molten, directing a blast of a heated high pressure gas on the sleeve and subsequently closing the internal opening of the sleeve with a screw member which is coated with a plastic material comprising a reaction product of bisphenol A and epichlorohydrin.

11. In the method of sealing a pore opening in a double glazed unit which comprises providing a pore opening in the face of one of the two spaced glass sheets forming the unit, coating the external periphery of a thin metal sleeve with a glass having a low fusion temperature, inserting the coated sleeve into the pore opening, superposing the glass sheets in spaced relation, heating the edges thereof to fusion temperature to form a glass to glass weld between the marginal edges of the sheets, the glass in the one sheet adjacent the pore opening being raised to the fusion temperature of the glass coating on the metal sleeve thereby sealing the sleeve in position and subsequently closing the internal opening of the sleeve, the step which comprises directing a heated gas on the metal sleeve during the welding operation.

12. A method of sealing a pore opening for a multiple glazed unit which comprises forming a pore opening in one of the glass sheets comprising the unit near the edge of said sheet, inserting an element having a hole therein in the pore opening, superposing the glass sheets in spaced relation with the glass sheet containing the pore opening being uppermost, heating the edges of the upper sheet to fusion temperature to cause the edges, including the pore opening and element inserted therein, to drop down and weld to the edges of the lower sheet and hermetically seal the element in the pore opening in the edge of the unit, and subsequently closing the internal opening of the element.

13. A method of sealing a pore opening for a multiple glazed unit which comprises forming a pore opening in one of the glass sheets comprising the unit near the edge of such sheet, providing such sheet with an electrically conducting stripe so as to locate the pore hole in the line of the stripe, inserting an element having a hole therein in the pore opening, superposing the glass sheets in spaced relation with the glass sheet containing the pore opening being uppermost, electrically heating the edges of the upper sheet to fusion temperature to cause the edges, including the pore opening and the element inserted therein, to drop down and weld to the edges of the lower sheet and hermetically seal the element in the pore opening in the edge of the unit, and subsequently closing the internal opening of the element.

14. A method of sealing a pore opening for a multiple glazed unit which comprises providing an element having an opening therein, suspending the element in the pore opening with a low fusion point glass separating the element from the edges of the pore opening, heating the area immediately adjacent the pore opening to a temperature sufficient to cause the low fusion point glass to hermetically seal the element in the pore opening, directing a blast of a heated high pressure gas on the element, and subsequently closing the internal opening of the element.

References Cited in the file of this patent

UNITED STATES PATENTS

| Number | Name | Date |
| --- | --- | --- |
| 1,296,165 | Costuma | Mar. 4, 1919 |
| 2,010,145 | Eitel | Aug. 6, 1935 |
| 2,125,372 | Fox | Aug. 2, 1938 |
| 2,345,278 | Monack | Mar. 28, 1944 |
| 2,389,360 | Guyer et al. | Nov. 20, 1945 |
| 2,399,526 | Warren, Jr. | Apr. 30, 1946 |
| 2,499,854 | Ellefson | Mar. 7, 1950 |
| 2,549,504 | Messana | Apr. 17, 1951 |